United States Patent
Wong et al.

(10) Patent No.: US 12,454,485 B1
(45) Date of Patent: Oct. 28, 2025

(54) QUICK-SETTING MAGNESIUM BASED CEMENT AND CONCRETE

(71) Applicant: ZS2 Technologies Ltd., Calgary (CA)

(72) Inventors: Danny Wong, Airdrie (CA); Ernest Darko, Calgary (CA); Parvaneh Roshankhajeh, Calgary (CA); Douglas Geoffrey Brown, Calgary (CA); Wenyi Hu, Calgary (CA)

(73) Assignee: ZS2 TECHNOLOGIES LTD., Calgary (CA)

( * ) Notice: Subject to any disclaimer, the term of this patent is extended or adjusted under 35 U.S.C. 154(b) by 0 days.

(21) Appl. No.: 19/187,586

(22) Filed: Apr. 23, 2025

Related U.S. Application Data

(60) Provisional application No. 63/762,426, filed on Feb. 24, 2025.

(51) Int. Cl.
| | |
|---|---|
| *C04B 28/10* | (2006.01) |
| *C04B 9/20* | (2006.01) |
| *C04B 22/16* | (2006.01) |
| *C04B 24/06* | (2006.01) |
| *C04B 24/10* | (2006.01) |
| *C04B 24/26* | (2006.01) |
| *C04B 24/34* | (2006.01) |
| *C04B 38/10* | (2006.01) |
| *C04B 103/12* | (2006.01) |
| *C04B 103/22* | (2006.01) |
| *C04B 103/30* | (2006.01) |

(52) U.S. Cl.
CPC ............. *C04B 28/105* (2013.01); *C04B 9/20* (2013.01); *C04B 22/16* (2013.01); *C04B 24/06* (2013.01); *C04B 24/10* (2013.01); *C04B 24/2623* (2013.01); *C04B 24/34* (2013.01); *C04B 38/10* (2013.01); *C04B 2103/12* (2013.01); *C04B 2103/22* (2013.01); *C04B 2103/302* (2013.01); *C04B 2103/304* (2013.01)

(58) Field of Classification Search
CPC ......... C04B 28/105; C04B 9/20; C04B 22/16; C04B 24/06; C04B 24/10; C04B 24/2623; C04B 24/34; C04B 38/10; C04B 2103/12; C04B 2103/22; C04B 2103/302; C04B 2103/304
See application file for complete search history.

(56) References Cited

FOREIGN PATENT DOCUMENTS

| CN | 108527597 A | * | 9/2018 | ............... B27N 1/00 |
| CN | 117247248 A | * | 12/2023 | ......... C04B 40/0039 |
| CN | 119241200 A | * | 1/2025 | ............. E01C 21/02 |

* cited by examiner

*Primary Examiner* — Anthony J Green
(74) *Attorney, Agent, or Firm* — Roni M. Jones; Oyen Wiggs Green & Mitala LLP

(57) ABSTRACT

A method of producing magnesium cement. The method may comprise mixing water at a temperature of between approximately 50° C. and 100° C., a magnesium oxygen-containing compound and a magnesium salt. In some embodiments, the water is heated to a temperature of between approximately 70° C. and 90° C. The magnesium oxygen-containing compound may comprise one or more of magnesium oxide and magnesium hydroxide. The magnesium salt may comprise one or more of magnesium acetate, magnesium bromide, magnesium oxalate, magnesium thiosulfate, magnesium phosphate, magnesium nitrate, magnesium silicate, a magnesium chloride in any hydration state, anhydrous magnesium chloride, hexahydrate magnesium chloride, a magnesium sulfate in any hydration state, anhydrous magnesium sulfate, heptahydrate magnesium sulfate and magnesium carbonate.

17 Claims, 5 Drawing Sheets

QUICK-SETTING MAGNESIUM BASED CEMENT AND CONCRETE

REFERENCE TO RELATED APPLICATIONS

This application claims priority from, and for the purposes of the United States the benefit under 35 USC 119 in relation to, U.S. patent application No. 63/762,426 filed 24 Feb. 2025 which is hereby incorporated herein by reference.

TECHNICAL FIELD

This invention relates to the field of magnesium based cements and magnesium based concretes and in particular to magnesium based cements and magnesium based concretes having reduced curing times.

BACKGROUND

Magnesium based cement (also referred to as magnesium cement) is an increasingly common alternative to conventional Portland cement. This may be due to the reduced carbon emission during production of magnesium cement. Additionally, magnesium cements have lower density, excellent durability, resistance to chemicals, resistance to fire, and thermal insulating properties, making magnesium cement suitable for a wide range of construction applications. However, typical setting times for magnesium cement may be too long for time sensitive construction projects, emergency repairs, cold weather applications and other applications which benefit from early development of high strength.

There is a general desire for quick-setting magnesium cements that set rapidly and exhibit early strength gains while still providing sufficient working time to facilitate pouring and minimize wastage.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method of producing magnesium cement. The method may comprise mixing water at a temperature of between approximately 50° C. and 100° C., a magnesium oxygen-containing compound and a magnesium salt.

In some embodiments, the water is at a temperature of between approximately 70° C. and 90° C. In some embodiments, the water is at a temperature of between approximately 70° C. and 79° C.

In some embodiments, the water comprises total dissolved solids of between approximately 0 and 350 g/L. In some embodiments, the water comprises total dissolved solids of between approximately 1 g/L and 250 g/L.

In some embodiments, the method comprises increasing the amount of total dissolved solids in the water before the mixing step. In some embodiments, the method comprises decreasing the amount of total dissolved solids in the water before the mixing step.

In some embodiments, the dissolved solids comprise one or more of sodium chloride, calcium chloride, a magnesium salt (e.g., magnesium chloride), magnesium sulfate and magnesium phosphate.

In some embodiments, the water comprises tap water. In some embodiments, the water comprises salt water. In some embodiments, the method comprises obtaining the water from seawater or ocean water before the mixing step. In some embodiments, the method comprises obtaining the water from industrial waste water before the mixing step.

In some embodiments, the magnesium oxygen-containing compound comprises magnesium oxide. In some embodiments, a molar ratio of magnesium oxide to water at the mixing step is between approximately 1:6 and 40:41. In some embodiments, a molar ratio of magnesium oxide to water at the mixing step is between approximately 1:3 and 15:16. In some embodiments, a molar ratio of magnesium oxide to water at the mixing step is between approximately 8:21 and 5:9.

In some embodiments, the magnesium oxygen-containing compound comprises magnesium hydroxide. In some embodiments, a molar ratio of magnesium hydroxide to water at the mixing step is between approximately 1:5 and 40:1. In some embodiments, a molar ratio of magnesium hydroxide to water at the mixing step is between approximately 2:5 and 15:1.

In some embodiments, the magnesium salt comprises one or more of magnesium acetate, magnesium bromide, magnesium oxalate, magnesium thiosulfate, magnesium phosphate, magnesium nitrate, magnesium silicate, a magnesium chloride in any hydration state (e.g., anhydrous magnesium chloride and hexahydrate magnesium chloride), a magnesium sulfate in any hydration state (e.g., anhydrous magnesium sulfate and heptahydrate magnesium sulfate) and magnesium carbonate. In some embodiments, the magnesium salt comprises one or more of magnesium phosphate, magnesium nitrate, magnesium silicate, a magnesium chloride in any hydration state (e.g., anhydrous magnesium chloride and hexahydrate magnesium chloride), a magnesium sulfate in any hydration state (e.g., anhydrous magnesium sulfate and heptahydrate magnesium sulfate) and magnesium carbonate. In some embodiments, the magnesium salt comprises one or more of anhydrous magnesium chloride, hexahydrate magnesium chloride, anhydrous magnesium sulfate, heptahydrate magnesium sulfate and magnesium carbonate.

In some embodiments, the method comprises producing the magnesium salt by combining the magnesium oxygen-containing compound and an acid. In some embodiments, the acid comprises one or more of acetic acid, hydrochloric acid, phosphoric acid, sulfuric acid and nitric acid.

In some embodiments, a molar ratio of the magnesium oxygen-containing compound to the magnesium salt at the mixing step is between approximately 1:1 and 40:1. In some embodiments, a molar ratio of the magnesium oxygen-containing compound to the magnesium salt at the mixing step is between approximately 5:1 and 30:1. In some embodiments, a molar ratio of the magnesium oxygen-containing compound to the magnesium salt at the mixing step is between approximately 5:1 and 15:1.

In some embodiments, the method comprises mixing the water, the magnesium oxygen-containing compound, the magnesium salt and one or more additives.

In some embodiments, the one or more additives comprise a retarder. In some embodiments, the retarder comprises one or more compounds containing carboxylic acid, malic acid, glutamic acid, gluconic acid, malonic acids, fumaric acid, oleic acid, palmitic acid, stearic acid, citric acid and salicylic acid. In some embodiments, the retarder comprises one or more of malic acid, glutamic acid, gluconic acid, malonic acids, fumaric acid, oleic acid, palmitic acid, stearic acid, citric acid and salicylic acid. In some embodiments, the retarder comprises one or more of citric acid and salicylic acid. In some embodiments, a ratio of retarder to magnesium oxygen-containing compound at the mixing step is between approximately 0 and 1:10 (by weight). In some embodiments, a ratio of retarder to magnesium oxygen-containing compound at the mixing step is between approximately 1:200 and 3:50 (by weight). In some embodiments, a ratio of retarder to magnesium oxygen-containing compound at the mixing step is between approximately 1:200 and 1:50 (by weight).

In some embodiments, the one or more additives comprise a stabilizer. In some embodiments, the stabilizer comprises one or more of potassium acetate, tartaric acid, an alkali metal salt, triethanolamine, lignosulfonate, hexametaphosphate, sodium gluconate, sucrose, polycarboxylate, borax and boric acid. In some embodiments, the stabilizer comprises one or more of lignosulfonate, hexametaphosphate, sodium gluconate, sucrose, polycarboxylate, borax and boric acid. In some embodiments, the stabilizer comprises one or more of sodium gluconate, sucrose, polycarboxylate, borax and boric acid. In some embodiments, between approximately 0% and 10% (by weight) of the magnesium cement comprises the stabilizer. In some embodiments, between approximately 0.1% and 0.6% (by weight) of the magnesium cement comprises the stabilizer. In some embodiments, between approximately 0.15% and 0.3% (by weight) of the magnesium cement comprises the stabilizer.

In some embodiments, the one or more additives comprise a moisture controller. In some embodiments, the moisture controller comprises one or more compounds containing silane, stearate or diol groups. In some embodiments, the moisture controller comprises one or more of calcium stearate, 2-methylpentale-2,4-diol and/or triethoxyoctylsilane. In some embodiments, between approximately 0% and 5% (by weight) of the magnesium cement comprises the moisture controller. In some embodiments, between approximately 0% and 3% (by weight) of the magnesium cement comprises the moisture controller. In some embodiments, between approximately 0.2% and 2.5% (by weight) of the magnesium cement comprises the moisture controller.

In some embodiments, the one or more additives comprise an accelerator. In some embodiments, the accelerator comprises one or more compounds containing nitrate, phosphate, chloride or nitrite groups. In some embodiments, the accelerator comprises one or more of ammonium phosphate, potassium phosphate and calcium nitrate. In some embodiments, the accelerator comprises calcium nitrate. In some embodiments, an amount of the accelerator at the mixing step is between approximately 0% and 5% (by weight) relative to an amount of the magnesium oxygen-containing compound. In some embodiments, an amount of the accelerator at the mixing step is between approximately 0% and 3% (by weight) relative to an amount of the magnesium oxygen-containing compound.

In some embodiments, the one or more additives comprise a foaming agent. In some embodiments, the foaming agent comprises one or more compounds containing reactive oxygen (e.g., hydrogen peroxide reacted with a catalyst such as potassium iodide), fatty alcohol sulfates (e.g., cocamidopropyl betaine), alkyl sulfates (e.g., sodium dodecyl sulfate or sodium lauryl sulfate), air and carbon dioxide. In some embodiments, an amount of the foaming agent at the mixing step is between approximately 0% and 10% (by weight) of an amount of the water. In some embodiments, an amount of the foaming agent at the mixing step is between approximately 0% and 6% (by weight) of an amount of the water.

In some embodiments, the one or more additives comprise an air entrainer. In some embodiments, the air entrainer comprises one or more compounds containing polymers (e.g., polyvinyl alcohol), polyether and bio-based materials (e.g., rosin and sodium lignosulfonate). In some embodiments, an amount of the air entrainer at the mixing step is between approximately 0% and 2.5% (by weight) of an amount of the water. In some embodiments, an amount of the air entrainer at the mixing step is between approximately 0% and 0.9% (by weight) of an amount of the water.

In some embodiments, the method comprises mixing the water with the magnesium salt to form an intermediate mixture and then mixing the intermediate mixture with the magnesium oxygen-containing compound.

Another aspect of the invention provides a method of producing magnesium concrete. The method may comprise producing a magnesium cement according to any one of the methods described herein and mixing the magnesium cement with aggregate.

In some embodiments, the aggregate comprises a carbonate aggregate. In some embodiments, the carbonate aggregate comprise one or more of calcium carbonate, magnesium carbonate and sodium carbonate. In some embodiments, between approximately 0% and 50% (by weight) of the magnesium concrete comprises the carbonate aggregate. In some embodiments, between approximately 10% and 40% (by weight) of the magnesium concrete comprises the carbonate aggregate. In some embodiments, between approximately 18% and 30% (by weight) of the magnesium concrete comprises the carbonate aggregate.

claim In some embodiments, the aggregate comprises a light aggregate. In some embodiments, the light aggregate comprises one or more of expanded glass, expanded shale, perlite, expanded polystyrene, extruded polystyrene, wood chips, sawdust, cellulose, diatomaceous earth. In some embodiments, between approximately 0% and 20% of the magnesium concrete comprises the light aggregate. In some embodiments, between approximately 0% and 15% (by weight) of the magnesium concrete comprises the light aggregate. In some embodiments, between approximately 0% and 10% (by weight) of the magnesium concrete comprises the light aggregate.

In some embodiments, the aggregate comprises a water absorbing aggregate. In some embodiments, the water absorbing aggregate comprises one or more of zeolite(s), clay(s), diatomaceous earth and biochar. In some embodiments, between approximately 0% and 20% (by weight) of the magnesium concrete comprises the water absorbing aggregate. In some embodiments, between approximately 0% and 10% (by weight) of the magnesium concrete comprises the water absorbing aggregate. In some embodiments, between approximately 0% and 5% (by weight) of the magnesium concrete comprises the water absorbing aggregate.

In some embodiments, the aggregate comprises a reinforcing aggregate. In some embodiments, the reinforcing aggregate comprises one or more of glass fiber, polyvinyl acetate fiber, polypropylene fiber, carbon fiber and basalt fibers. In some embodiments, between approximately 0% and 10% (by weight) of the magnesium concrete comprises the reinforcing aggregate. In some embodiments, between approximately 0% and 6% (by weight) of the magnesium concrete comprises the reinforcing aggregate. In some embodiments, between approximately 0% and 4% (by weight) of the magnesium concrete comprises the reinforcing aggregate.

In some embodiments, the magnesium cement has a temperature of between approximately 21° C. and 55° C. when mixing the magnesium cement with aggregate. In some embodiments, the magnesium cement has a temperature of between approximately 27° C. and 52° C. when mixing the magnesium cement with aggregate. In some embodiments, the magnesium cement has a temperature of between approximately 27° C. and 45° C. when mixing the magnesium cement with aggregate.

In some embodiments, the method comprises mixing the magnesium cement with aggregate and one or more concrete additives.

In some embodiments, the one or more concrete additives comprise a retarder. In some embodiments, the retarder comprises one or more compounds containing carboxylic acid, malic acid, glutamic acid, gluconic acid, malonic acids, fumaric acid, oleic acid, palmitic acid, stearic acid, citric acid and salicylic acid. In some embodiments, the retarder comprises one or more of malic acid, glutamic acid, gluconic acid, malonic acids, fumaric acid, oleic acid, palmitic acid, stearic acid, citric acid and salicylic acid. In some embodiments, the retarder comprises one or more of citric acid and salicylic acid. In some embodiments, a ratio of retarder to magnesium oxygen-containing compound in the magnesium cement at the mixing step is between approximately 0 and 1:10 (by weight). In some embodiments, the method comprises a ratio of retarder to magnesium oxygen-containing compound in the magnesium cement is between approximately 1:200 and 3:50 (by weight). In some embodiments, a ratio of retarder to magnesium oxygen-containing compound in the magnesium cement is between approximately 1:200 and 1:50 (by weight).

In some embodiments, the one or more concrete additives comprise a stabilizer. In some embodiments, the stabilizer comprises one or more of potassium acetate, tartaric acid, an alkali metal salt, triethanolamine, lignosulfonate, hexametaphosphate, sodium gluconate, sucrose, polycarboxylate, borax and boric acid. In some embodiments, the stabilizer comprises one or more of lignosulfonate, hexametaphosphate, sodium gluconate, sucrose, polycarboxylate, borax and boric acid. In some embodiments, the stabilizer comprises one or more of sodium gluconate, sucrose, polycarboxylate, borax and boric acid. In some embodiments, between approximately 0% and 0.096% (by weight) of the magnesium concrete comprises the stabilizer. In some embodiments, between approximately 0.002% and 0.04% (by weight) of the magnesium concrete comprises the stabilizer. In some embodiments, between approximately 0.003% and 0.007% (by weight) of the magnesium concrete comprises the stabilizer.

In some embodiments, the one or more concrete additives comprise a moisture controller. In some embodiments, the moisture controller comprises one or more compounds containing silane, stearate or diol groups. In some embodiments, the moisture controller comprises one or more of calcium stearate, 2-methylpentale-2,4-diol and/or triethoxyoctylsilane. In some embodiments, between approximately 0% and 1% (by weight) of the magnesium concrete comprises the moisture controller. In some embodiments, between approximately 0.1% and 0.8% (by weight) of the magnesium concrete comprises the moisture controller. In some embodiments, between approximately 0.3% and 0.7% (by weight) of the magnesium concrete comprises the moisture controller.

In some embodiments, the one or more concrete additives comprise an accelerator. In some embodiments, the accelerator comprises one or more compounds containing nitrate, phosphate, chloride or nitrite groups. In some embodiments, the accelerator comprises one or more of ammonium phosphate, potassium phosphate and calcium nitrate. In some embodiments, the accelerator comprises calcium nitrate. In some embodiments, between approximately 0% and 0.5% (by weight) of the magnesium concrete comprises the accelerator. In some embodiments, between approximately 0.007% and 0.05% (by weight) of the magnesium concrete comprises the accelerator.

In some embodiments, the one or more concrete additives comprise a foaming agent. In some embodiments, the foaming agent comprises one or more compounds containing reactive oxygen (e.g., hydrogen peroxide reacted with a catalyst such as potassium iodide), fatty alcohol sulfates (e.g., cocamidopropyl betaine), alkyl sulfates (e.g., sodium dodecyl sulfate or sodium lauryl sulfate), air and carbon dioxide. In some embodiments, between approximately 0% and 1.1% (by weight) of the magnesium concrete comprises the foaming agent. In some embodiments, between approximately 0.01% and 0.2% (by weight) of the magnesium concrete comprises the foaming agent. In some embodiments, between approximately 0.07% and 0.15% (by weight) of the magnesium concrete comprises the foaming agent.

In some embodiments, the one or more concrete additives comprise an air entrainer. In some embodiments, the air entrainer comprises one or more compounds containing polymers (e.g., polyvinyl alcohol), polyether and bio-based materials (e.g., rosin and sodium lignosulfonate). In some embodiments, between approximately 0% and 0.5% (by weight) of the magnesium concrete comprises the air entrainer. In some embodiments, between approximately 0.01% and 0.4% (by weight) of the magnesium concrete comprises the air entrainer. In some embodiments, between approximately 0.06% and 0.14% (by weight) of the magnesium concrete comprises the air entrainer.

Another aspect of the invention provides a method of casting magnesium concrete. The method may comprise producing magnesium concrete according to any one of the methods described herein, pouring the magnesium concrete into a formwork and allowing the magnesium concrete to cure in the formwork.

In some embodiments, the method comprises allowing the magnesium concrete to cure in the formwork during a first period of time at a first temperature and a first humidity and then during a second period of time at a second temperature and a second humidity.

In some embodiments, the first temperature is between approximately 20° C. and 35° C. In some embodiments, the second temperature is ambient temperature. In some embodiments, the second temperature is between approximately 10° C. and 20° C.

In some embodiments, the first humidity is between 50% and 90%. In some embodiments, the first humidity is between 30% and 100%. In some embodiments, the first humidity is ambient humidity.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides a method of producing magnesium cement. The method may comprise mixing heated water with a magnesium oxygen-containing compound and a magnesium salt. The heated water may be heated to a temperature of between approximately 50° C. and 100° C., between approximately 70° C. and 90° C. or between approximately 70° C. and 79° C.

Figure 1:
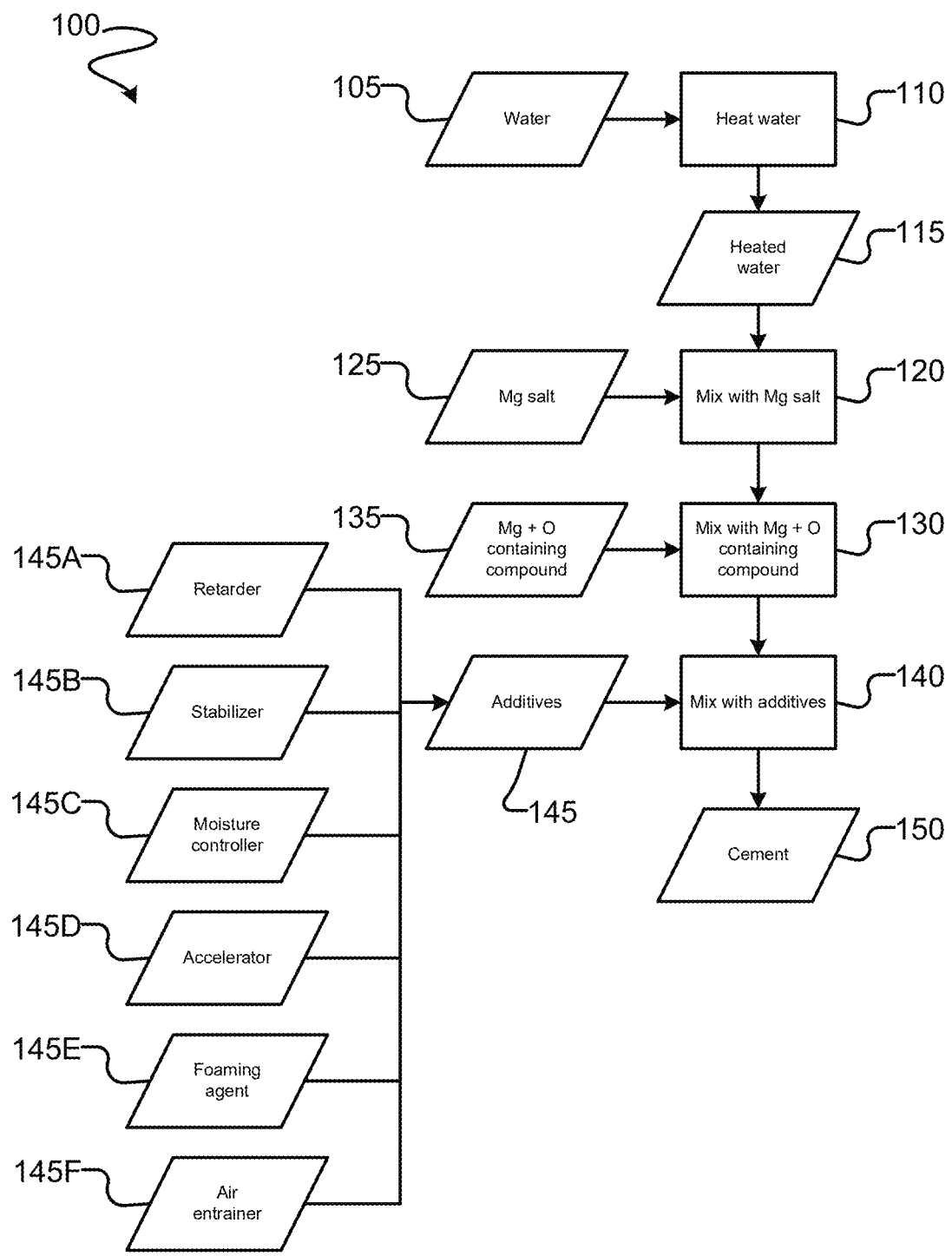
FIG. 1 depicts an exemplary method of producing magnesium cement according to an embodiment of the invention.

FIG. 1 depicts an exemplary method 100 for forming magnesium-based cement 150 according to an embodiment of the invention.

At block 110, water 105 is heated to form heated water 115. Water 105 may be heated to a temperature of between approximately 50° C. and 100° C., between approximately 70° C. and 90° C. or between approximately 70° C. and 79° C. to form heated water 115.

Figure 2A:
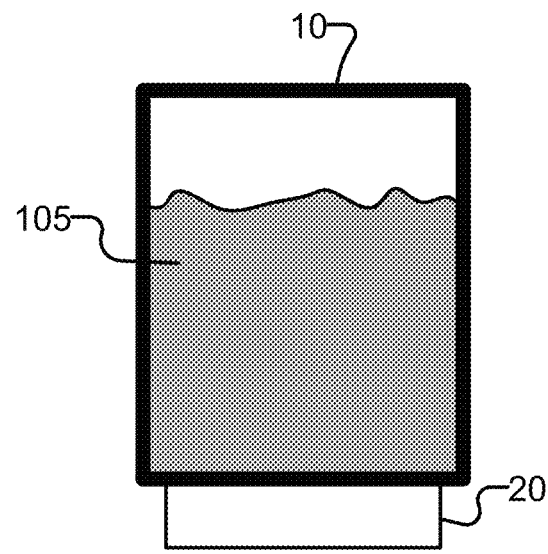
FIG. 2A is a schematic depiction of an exemplary vessel for heating water according to an embodiment of the invention.

Water 105 may be heated in a vessel 10 by a heater 20, as shown in FIG. 2A. Vessel 10 may comprise any suitable vessel. Likewise, heater 20 may comprise any suitable heater for heating the contents of vessel 10. For example, heater 20 may use electricity, fire (e.g., wood-fueled fire, propane-fueled fire or the like), waste heat from another process or machine, solar energy or the like. Heater 20 may comprise, for example, a water boiler, a gas water heater, an electric water heater, a heat pump or the like. Heater 20 may comprise heating elements or coils inside and/or outside vessel 10.

Water 105 may comprise salt water. Water 105 may contain one or more dissolved solids. For example, one or more of the following may be dissolved in water 105: sodium chloride, calcium chloride and magnesium salts (e.g., magnesium chloride, magnesium sulfate and/or magnesium phosphate). Water 105 may have total dissolved solids at a concentration of between approximately 0 g/L and 350 g/L or between approximately 1 g/L and 250 g/L.

Water 105 may be obtained from any suitable source. For example, water 105 may be obtained from tap water, seawater, ocean water, waste water such as industrial waste water tailings (e.g., oil and gas tailings or mining tailings), mining brine solutions or the like.

In some embodiments, water 105 is treated prior to use at block 110. For example, the amount of total dissolved solids in water 105 may be increased or decreased prior to block 110. In some embodiments, salt (e.g., magnesium chloride, magnesium sulfate) may be added to water 105 to achieve a desired concentration of total dissolved solids prior to block 110. In some embodiments, water 105 may be filtered to remove undesirable elements (e.g., heavy hydrocarbons).

At block 120, a magnesium salt 125 is mixed with heated water 155 in vessel 30.

Figure 2B:
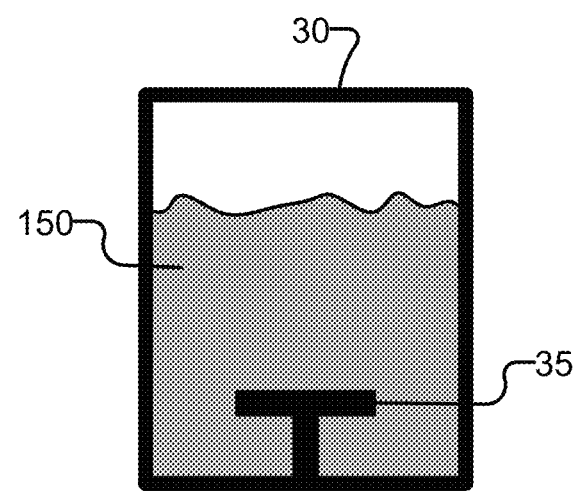
FIG. 2B is a schematic depiction of an exemplary vessel for mixing cement according to an embodiment of the invention.

Vessel 30 may comprise any suitable vessel. Vessel 30 may comprise vessel 10 (e.g., the same vessel may be employed at block 110 and block 120). Vessel 30 may comprise one or more mixing elements 35 (as shown in FIG. 2B) to facilitate or cause mixing of heated water 115 with magnesium salt 125 at block 120. Mixing elements 35 may comprise one or more elements within vessel 30 (e.g., impellers) or one or more elements outside of vessel 30 (e.g., a mechanism for rotating vessel 30 about a non-vertical axis similar to a drum mixer).

In some embodiments, magnesium salt 125 comprises one or more of magnesium acetate, magnesium bromide, magnesium oxalate, magnesium thiosulfate, magnesium phosphate, magnesium nitrate, magnesium silicate, a magnesium chloride in any hydration state (e.g., anhydrous magnesium chloride and magnesium chloride hexahydrate), a magnesium sulfate in any hydration state (e.g., anhydrous magnesium sulfate and magnesium sulfate heptahydrate) and magnesium carbonate. In some embodiments, magnesium salt 125 comprises one or more of magnesium phosphate, magnesium nitrate, magnesium silicate, a magnesium chloride in any hydration state (e.g., anhydrous magnesium chloride and hexahydrate magnesium chloride), a magnesium sulfate in any hydration state (e.g., anhydrous magnesium sulfate and heptahydrate magnesium sulfate) and magnesium carbonate. In some embodiments, magnesium salt 125 comprises one or more of anhydrous magnesium chloride, hexahydrate magnesium chloride, anhydrous magnesium sulfate, heptahydrate magnesium sulfate and magnesium carbonate.

In some embodiments, at block 120, magnesium salt 125 may be mixed with heated water 105 in vessel 30 at a molar ratio of heated water 105 to magnesium salt 125 of between approximately 5:1 and 46:1, between approximately 13:1 and 27:1 or between approximately 19:1 and 22:1. In some embodiments, the molar ratio of heated water 105 to magnesium salt 125 is dependent on the composition and/or hydration state of magnesium salt 125.

In some embodiments, magnesium salt 125 is produced by reacting magnesium oxygen-containing compound 135 with an acid. Suitable acids for such a reaction may comprise, for example, one or more of acetic acid, hydrochloric acid, sulfuric acid, phosphoric acid and nitric acid.

At block 130, magnesium oxygen-containing compound 135 is mixed with heated water 115 and magnesium salt 125 in vessel 30. Magnesium oxygen-containing compound 135 may comprise magnesium oxide (MgO) or magnesium hydroxide ($Mg(OH)_2$).

In some embodiments, at block 130, magnesium oxygen-containing compound 135 may be mixed with magnesium salt 125 and heated water 115 in vessel 30 at block 130 at a molar ratio of magnesium oxygen-containing compound 135 to magnesium salt 125 of between approximately 1:1 and 40:1, between approximately 5:1 and 30:1 or between approximately 5:1 and 15:1. In some embodiments, at block 130, magnesium oxygen-containing compound 135 may be mixed with magnesium salt 125 and heated water 115 in vessel 30 at block 130 at a molar ratio of magnesium oxygen-containing compound to water of between approximately 1:6 and 40:1. In some embodiments, the molar ratio of magnesium oxygen-containing compound 135 to heated water 115 is dependent on the composition and/or hydration state of magnesium oxygen-containing compound 135.

Where magnesium oxygen-containing compound 135 comprises MgO, MgO may be mixed with heated water 115 and magnesium salt 125 at block 130 in vessel 30 at a molar ratio of MgO to heated water 115 of between approximately 1:6 and 40:41, between approximately 1:3 and 15:16 or between approximately 8:21 and 5:9.

Where magnesium oxygen-containing compound 135 comprises Mg(OH)$_2$, Mg(OH)$_2$ may be mixed with heated water 115 and magnesium salt 125 at block 130 in vessel 30 at a molar ratio of Mg(OH)$_2$ to heated water 115 of between approximately 1:5 and 40:1 or between approximately 2:5 and 15:1.

At optional block 140, one or more additives 145 may be mixed with the mixture of heated water 105, magnesium oxygen-containing compound 135 and magnesium salt 125 in vessel 30 to form cement 150. Where block 140 does not occur, cement 150 may be output directly from block 130. Additives 145 may comprise, for example, a retarder 145A, a stabilizer 145B, a moisture controller 145C, an accelerator 145D, a foaming agent 145E and/or an air entrainer 145F.

Retarder 145A may comprise any suitable retarder for slowing down the setting time of cement 150 made by method 100. In some embodiments, retarder 145A comprises one or more compounds containing carboxylic acid, malic acid, glutamic acid, gluconic acid, malonic acids, fumaric acid, oleic acid, palmitic acid, stearic acid, citric acid and salicylic acid. In some embodiments, retarder 145A comprises one or more of malic acid, glutamic acid, gluconic acid, malonic acids, fumaric acid, oleic acid, palmitic acid, stearic acid, citric acid and salicylic acid. In some embodiments, retarder 145A comprises one or more of citric acid and salicylic acid.

In some embodiments retarder 145A is mixed with the mixture of heated water 105, magnesium salt 125 and magnesium oxygen-containing compound 135 in vessel 30 based at least in part on the amount of magnesium oxygen-containing compound 135 in vessel 30. For example, retarder 145A may be mixed at block 140 at a ratio of retarder 145A to magnesium oxygen-containing compound 135 of between approximately 0 and 1:10 (by weight), between approximately 1:200 and 3:50 (by weight) or between approximately 1:200 and 1:50 (by weight).

Stabilizer 145B may comprise any suitable stabilizer for increasing the long-term stability and/or durability of cement 150 made by method 100. In some embodiments, stabilizer 145B comprises one or more of potassium acetate, tartaric acid, an alkali metal salt, triethanolamine, lignosulfonate, hexametaphosphate, sodium gluconate, sucrose, polycarboxylate, borax and boric acid. In some embodiments, stabilizer 145B comprises one or more of lignosulfonate, hexametaphosphate, sodium gluconate, sucrose, polycarboxylate, borax and boric acid. In some embodiments, stabilizer 145B comprises one or more of sodium gluconate, sucrose, polycarboxylate, borax and boric acid.

In some embodiments stabilizer 145B may be added in a quantity such that between approximately 0% and 10% (by weight) of cement 150 comprises stabilizer 145B, between approximately 0.1% and 0.6% (by weight) of cement 150 comprises stabilizer 145B or between approximately 0.15% and 0.3% (by weight) of cement 150 comprises stabilizer 145B.

Moisture controller 145C may comprise any suitable moisture controller for improving long term water resistance and/or freeze thaw performance of cement 150. In some embodiments, moisture controller 145C comprises one or more compounds containing silane, stearate or diol groups. For example, moisture controller 145C may comprise calcium stearate, 2-methylpentale-2,4-diol and/or triethoxyoctylsilane.

In some embodiments moisture controller 145C may be added in a quantity such that between approximately 0% and 5% (by weight) of cement 150 comprises moisture controller 145C, between approximately 0% and 3% (by weight) of cement 150 comprises moisture controller 145C or between approximately 0.2% and 2.5% (by weight) of cement 150 comprises moisture controller 145C.

Accelerator 145D may comprise any suitable cement hydration accelerator for reducing setting times and/or improving early mechanical strength of cement 150. In some embodiments, accelerator 145D comprises one or more compounds containing nitrate, phosphate, chloride or nitrite groups. In some embodiments, accelerator comprises one or more of ammonium phosphate, potassium phosphate and calcium nitrate. In some embodiments, accelerator 145D comprises calcium nitrate.

In some embodiments accelerator may be added in a quantity between approximately 0% and 6% (by weight) relative to the amount of magnesium oxygen-containing compound 135 or between approximately 0% and 3% (by weight) relative to the amount of magnesium oxygen-containing compound 135.

Foaming agent 145E may comprise any suitable foaming agent for introducing air content for the purposes of lowering density of cement 150. In some embodiments, foaming agent 145E comprises one or more compounds containing reactive oxygen such as hydrogen peroxide reacted with a catalyst such as potassium iodide, fatty alcohol sulfates such as cocamidopropyl betaine, alkyl sulfates such as sodium dodecyl sulfate or sodium lauryl sulfate, air, carbon dioxide.

In some embodiments foaming agent 145E may be added in a quantity between approximately 0% and 10% (by weight) relative to the amount of heated water 115 or between approximately 0% and 6% (by weight) relative to the amount of heated water 115.

Air entrainer 145F may comprise any suitable air entrainer for stabilizing air within cement 150 and/or producing more uniform air pocket size in cement 150. In some embodiments, air entrainer 145F comprises one or more compounds containing polymers such as polyvinyl alcohol, polyether and bio-based materials such as rosin and sodium lignosulfonate.

In some embodiments air entrainer 145F may be added in a quantity between approximately 0% and 2.5% (by weight) relative to the amount of heated water 115 or between approximately 0% and 0.9% (by weight) relative to the amount of heated water 115.

In some embodiments, a single compound may be employed as foaming agent 145E and air entrainer 145F (e.g., an alkyl sulfate). Where a single compound is employed as foaming agent 145E and air entrainer 145F, it may be added in a quantity between approximately 0% and 12.5% (by weight) relative to the amount of heated water 115 or between approximately 0% and 6.9% (by weight) relative to the amount of heated water 115.

In some embodiments, the order of blocks of method 100 may be varied. For example magnesium salt 125 may be mixed with water 105 before block 110 such that magnesium salt 125 and water 105 are heated together at block 110, magnesium salt 125 and magnesium oxygen-containing compound 135 may be added to heated water 115 together and/or some or all of additives 145 may be added before block 140.

Figure 3:
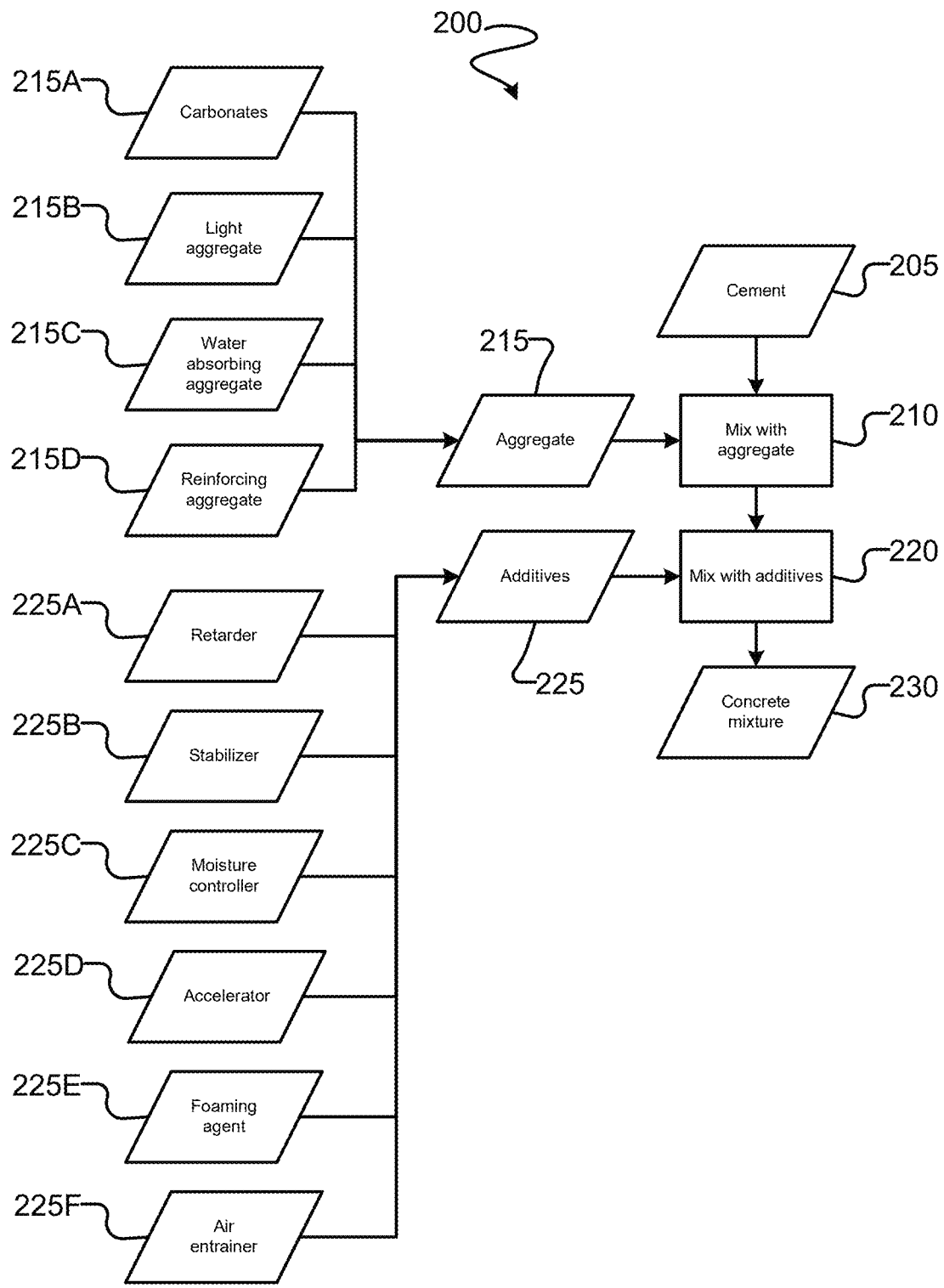
FIG. 3 depicts an exemplary method of producing concrete according to an embodiment of the invention.

Another aspect of the invention provides a method for producing a concrete mixture from cement. FIG. 3 depicts an exemplary method 200 for producing a concrete mixture 230 from a cement 205 according to an embodiment of the invention. Cement 205 may comprise a magnesium cement. Cement 205 may comprise a quick setting magnesium cement. In some embodiments, cement 205 comprises cement 150 output from method 100.

At block 210, cement 205 is mixed with aggregate 215 in a vessel (e.g., vessel 30 or another vessel). For convenience, method 200 is described herein as employing vessel 30 but it should be understood that other vessels could be used and it is not mandatory for the same vessel to be used in method 100 and method 200.

Cement 205 may comprise, for example, cement 150 output from method 100. As cement 150 is made with heated water 115, cement 150 may, at block 210, still have some residual heat from heated water 115. For example, cement 150 may have a temperature of between approximately 21° C. and 55° C., between approximately 27° C. and 52° C. or between approximately 27° C. and 45° C. This residual heat may assist in curing of concrete mixture 230.

Aggregate 215 may comprise any suitable type of aggregate(s). In some embodiments, aggregate 215 comprises one or more of carbonate aggregate 215A, light aggregate 215B, water absorbing aggregate 215C and reinforcing aggregate 215D.

Carbonate aggregate 215A may comprise any carbonates suitable as an aggregate for a magnesium concrete. For example, carbonate aggregate 215A may comprise one or more of calcium carbonate, magnesium carbonate and sodium carbonate. Where carbonate aggregate 215A comprises calcium carbonate, the calcium carbonate particles may have a nominal size of between approximately 0um and 150 μm (e.g., 90% of the particles may pass through a filter having openings of between approximately 0 μm and 150 μm in diameter). Where carbonate aggregate 215A comprises calcium carbonate, the magnesium carbonate particles may have a nominal size of between approximately 0 μm and 55 μm (e.g., 90% of the particles may pass through a filter having openings of between approximately 0um and 55 μm in diameter). Carbonate aggregate 215A may be obtained from mining. In some embodiments, carbonate aggregate 215A undergoes one or more stages of crushing to achieve desired size ranges. In some embodiments, carbonate aggregate 215A is obtained from precipitation of a brine with carbon dioxide as disclosed, for example, in U.S. Pat. No. 11,905,214 Issued 20 Feb. 2024 for Methods For Re-Using Industrial Waste For Carbon Sequestration And Magnesium-Based Cements which is hereby incorporated herein by reference. In some embodiments, carbonate aggregate 215A is a by-product of mining or calcining (e.g., dust created from mining or calcining).

In some embodiments, carbonate aggregate 215A is mixed with cement 205 at block 210 such that between approximately 0% and 50% (by weight) of concrete mixture 230 comprises carbonate aggregate 215A, between approximately 10% and 40% (by weight) of concrete mixture 230 comprises carbonate aggregate 215A or between approximately 18% and 30% (by weight) of concrete mixture 230 comprises carbonate aggregate 215A.

Light aggregate 215B may comprise any suitable aggregate for controlling (e.g., reducing) the density of concrete mixture 230. For example, light aggregate 215B may comprise one or more of expanded glass, expanded shale, perlite, expanded polystyrene, extruded polystyrene, wood chips, sawdust, cellulose, diatomaceous earth. In some embodiments, the particle size of light aggregate 215B has a nominal size between approximately 250 μm and 2500 μm (e.g., 90% of the particles may pass through a filter having openings of between approximately 250 μm and 2500 μm in diameter).

In some embodiments, light aggregate 215B is mixed with cement 205 at block 210 such that between approximately 0% and 20% (by weight) of concrete mixture 230 comprises light aggregate 215B, between approximately 0% and 15% (by weight) of concrete mixture 230 comprises light aggregate 215B or between approximately 0% and 10% (by weight) of concrete mixture 230 comprises light aggregate 215B.

Water absorbing aggregate 215C may comprise any suitable aggregate to control the viscosity of concrete mixture 230. For example, water absorbing aggregate 215C may comprise one or more of zeolite(s), clay(s), diatomaceous earth and biochar.

In some embodiments, water absorbing aggregate 215C is mixed with cement 205 at block 210 such that between approximately 0% and 20% (by weight) of concrete mixture 230 comprises water absorbing aggregate 215C, between approximately 0% and 10% (by weight) of concrete mixture 230 comprises water absorbing aggregate 215C or between approximately 0% and 5% (by weight) of concrete mixture 230 comprises water absorbing aggregate 215C.

Reinforcing aggregate 215D may comprise any suitable aggregate to increase tensile and/or flexural strength of cast concrete formed from concrete mixture 230. For example, reinforcing aggregate 215D may comprise one or more of glass fiber, polyvinyl acetate fiber, polypropylene fiber, carbon fiber and basalt fibers. In some embodiments, fiber lengths of reinforcing aggregate 215D are between approximately 6 mm and 15 mm.

In some embodiments, reinforcing aggregate 215D is mixed with cement 205 at block 210 such that comprises between approximately 0% and 10% (by weight) of concrete mixture 230 comprises reinforcing aggregate 215D, between approximately 0% and 6% (by weight) of concrete mixture 230 comprises reinforcing aggregate 215D or between approximately 0% and 4% (by weight) of concrete mixture 230 comprises reinforcing aggregate 215D.

At optional block 220, one or more additives 225 may be mixed with the mixture of cement 205 and aggregate 215 to form concrete mixture 230. Where block 220 does not occur, concrete mixture 230 may be output directly from block 210. Additives 225 may comprise, for example, a retarder 225A, a stabilizer 225B, a moisture controller 225C, an accelerator 225D, a foaming agent 225E and/or an air entrainer 225F.

Retarder 225A may comprise any suitable retarder for slowing down the setting time of concrete mixture 230. Retarder 225A may have the same composition as retarder 145A.

Retarder 225A may be mixed at block 220 at a ratio of retarder 225A to magnesium oxygen-containing compound in cement 205 of between approximately 0 and 1:10 (by weight), between approximately 1:200 and 3:50 (by weight) or between approximately 1:200 and 1:50 (by weight).

Stabilizer 225B may comprise any suitable stabilizer for increasing the long-term stability and/or durability of concrete mixture 230. Stabilizer 225B may have the same composition as stabilizer 145B.

In some embodiments retarder 225A may be added in a quantity such that between approximately 0% and 0.096% (by weight) of concrete mixture 230 comprises retarder 225A, between approximately 0.002% and 0.04% (by weight) of concrete mixture 230 comprises retarder 225A or between approximately 0.003% and 0.007% (by weight) of concrete mixture 230 comprises retarder 225A.

Moisture controller 225C may comprise any suitable moisture controller for improving long term water resistance and/or freeze thaw performance of concrete mixture 230. Moisture controller 225C may have the same composition as moisture controller 145C.

In some embodiments moisture controller 225C may be added in a quantity such that between approximately 0% and 1% (by weight) of concrete mixture 230 comprises moisture controller 225C, between approximately 0.1% and 0.8% (by weight) of concrete mixture 230 comprises moisture controller 225C or between approximately 0.3% and 0.7% (by weight) of concrete mixture 230 comprises moisture controller 225C.

Accelerator 225D may comprise any suitable cement hydration accelerator for reducing setting times and/or improving early mechanical strength of concrete mixture 230. Accelerator 225D may have the same composition as accelerator 145D.

In some embodiments accelerator 225D may be added in a quantity such that between approximately 0% and 0.5% (by weight) of concrete mixture 230 comprises accelerator 225D or between approximately 0.007% and 0.05% (by weight) of concrete mixture 230 comprises accelerator 225D.

Foaming agent 225E may comprise any suitable foaming agent for introducing air content for the purposes of lowering density of concrete mixture 230. Foaming agent 225E may have the same composition as foaming agent 145E.

In some embodiments foaming agent 225E may be added in a quantity such that between approximately 0% and 1.1% (by weight) of concrete mixture 230 comprises foaming agent 225E, between approximately 0.01% and 0.2% (by weight) of concrete mixture 230 comprises foaming agent 225 or between approximately 0.07% and 0.15% (by weight) of concrete mixture 230 comprises foaming agent 225.

Air entrainer 225F may comprise any suitable air entrainer for stabilizing air within concrete mixture 230 and/or producing more uniform air pocket size in concrete mixture 230. Air entrainer 225F may have the same composition as air entrainer 145F.

In some embodiments foaming agent 225F may be added in a quantity such that between approximately 0% and 0.5% (by weight) of concrete mixture 230 comprises foaming agent 225F, between approximately 0.01% and 0.4% (by weight) of concrete mixture 230 comprises foaming agent 225F or between approximately 0.06% and 0.14% (by weight) of concrete mixture 230 comprises foaming agent 225F.

In some embodiments, a single compound may be employed as foaming agent 225E and air entrainer 225F (e.g., an alkyl sulfate).

In some embodiments, the order of blocks of method 200 may be varied. For example additives 225 may be mixed with aggregate 215 before aggregate 215 is mixed with cement 205.

Figure 4:
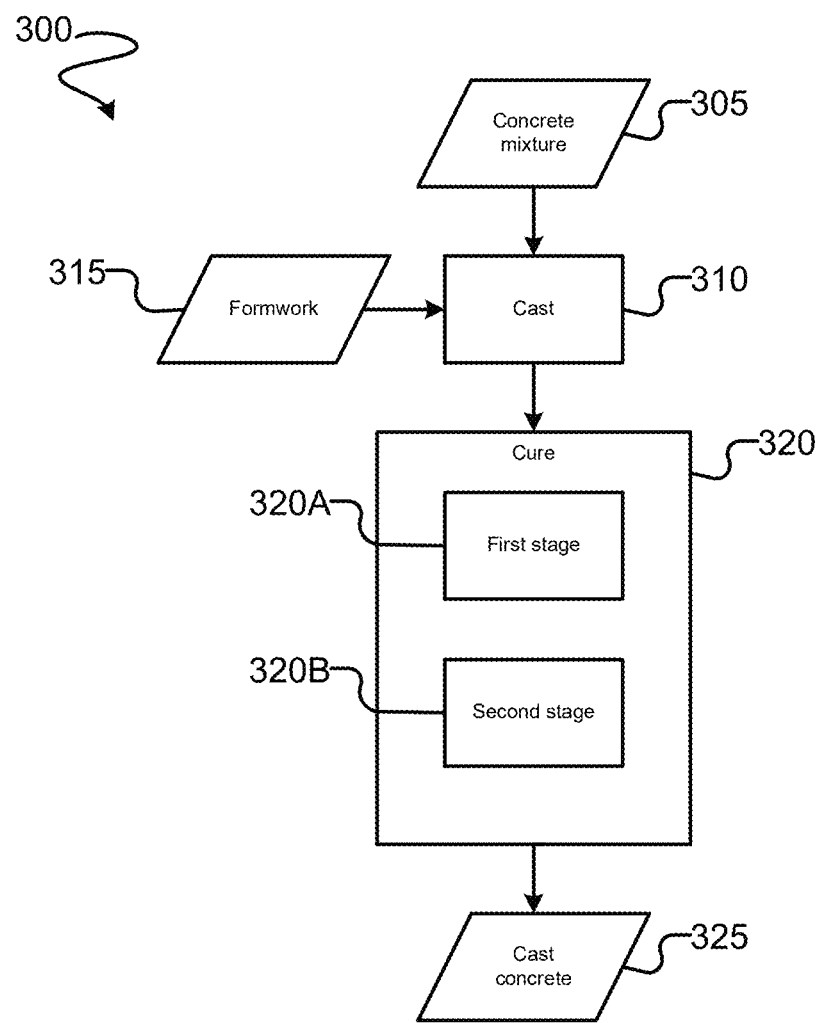
FIG. 4 depicts an exemplary method of casting concrete according to an embodiment of the invention.

Another aspect of the invention provides a method for casting concrete. FIG. 4 depicts an exemplary method 300 of casting concrete.

At block 310, an uncured concrete mixture 305 is poured (or otherwise placed) in a formwork 315. Uncured concrete mixture 305 may comprise an uncured magnesium concrete mixture. Uncured concrete mixture 305 may comprise an uncured quick setting magnesium concrete mixture. Uncured concrete mixture 305 may comprise concrete mixture 230 output from method 200.

Formwork 315 may comprise any suitable type of formwork. For example, formwork 315 may comprise timber formwork, rubber (e.g., polyurethane or silicone) formwork, steel or aluminum formwork, plastic formwork, fabric formwork or precast formwork. Formwork 315 may comprise removable formwork (e.g., formwork that is removed after concrete mixture 305 is cured) or stay-in-place formwork (e.g., formwork that remains in place even after concrete mixture 305 is cured). In some embodiments, formwork 315 comprises one or more heating elements (e.g., heating coils for heating concrete mixture 305 within formwork 315) and/or insulating elements for maintaining a temperature of concrete mixture 305 within formwork 315 (e.g., insulation wrapped around formwork 315 or within formwork 315). In some embodiments, formwork 315 comprises one or more elements to control humidity within formwork 315 such as mist heads, humidifiers, etc. In some embodiments, formwork 315 is a sealed system such that moisture is trapped within formwork 315 during curing. In some embodiments, formwork 315 is located in a humidity controlled environment.

Formwork 315 may be employed in situ (e.g., in the location where the resultant concrete structure wills stay) or ex situ (e.g., off-site such that the resultant concrete structure is transported to another location for use). A vibrator, tamping rod, a mechanical press, or the like may be employed at block 310 to reduce air pockets and ensure concrete mixture 305 properly fills formwork 315.

At block 320, concrete mixture 305 is allowed to cure in formwork 315 to create cast concrete 325.

In some embodiments, block 320 involves curing at relatively elevated humidity. This may involve preserving existing water content in concrete mixture 305 or adding water to concrete mixture 305 during block 320. Adding water at block 320 may comprise, for example, misting, spraying, ultrasonic dispensing, mechanical dispensing (e.g. fans). Preserving existing water content in concrete mixture 305 at block 320 may comprise, for example, adding a top layer to seal formwork 315, stacking formworks 315, or placing formwork 315 in a room with vapor barriers or other humidity controls.

In some embodiments, block 320 involves allowing concrete mixture 305 to cure at or below ambient temperature (e.g., at a temperature of between approximately 10° C. and 20° C.).

In some embodiments, block 320 involves allowing concrete mixture 305 to cure above ambient temperature (e.g., at a temperature of between approximately 20° C. and 35° C.). Allowing concrete mixture 305 to cure above ambient temperature (e.g., at a temperature of between approximately 20° C. and 35° C.) may comprise, for example, applying heat to concrete mixture 305 and/or formwork 315. Applying heat to concrete mixture 305 and/or formwork 315 may comprise, for example, locating formwork 315 with concrete mixture 305 outside on a warm day (e.g., with a temperature of between approximately 20° C. and 35° C. or higher), locating formwork 315 with concrete mixture 305 in a well insulated room, heating a room in which formwork 315 with concrete mixture 305 is located (e.g., by venting in waste heat from another industrial process, by employing an HVAC system, with a space heater, etc.), heating formwork 315 (e.g., by wrapping heating coils or a heated blanket around at least a portion of formwork 315), etc.

In some embodiments, block 320 comprises a plurality of curing stages. For example, block 320 may comprise a first curing stage 320A and a second curing stage 320B. In some embodiments, first curing stage 320A involves allowing concrete mixture 305 to cure above ambient temperature (e.g., at a temperature of between approximately 20° C. and 35° C.). In some embodiments, second curing stage 320B involves allowing concrete mixture 305 to cure at ambient temperature (e.g., at a temperature of between approximately 10° C. and 20° C.).

In some embodiments, first curing stage 320A involves curing concrete mixture 305 with a humidity of between 50% and 90%. In some embodiments, second curing stage 320B involves curing concrete mixture 305 with a humidity of between 30% and 100%. In some embodiments, second curing stage 320B involves curing concrete mixture 205 at ambient humidity.

In some embodiments, first curing stage 320A lasts between approximately 2 and 6 hours. In some embodiments, second curing stages 320B lasts between approximately 6 and 24 hours or longer.

The invention will now be described with reference to specific examples. It will be understood that the following examples are intended to describe embodiments of the invention and are not intended to limit the invention in any way. It will be understood that certain aspects of the disclosed processes can be arranged and combined in a wide variety of different configurations, all of which are contemplated herein.

Experimental Results

In a first experiment, concrete was formed according to method 200 described herein by employing cement formed according to method 100 described herein wherein the composition of the concrete comprised:

TABLE 1

| Concrete Composition for First Experiment | |
| --- | --- |
| Constituent | Weight % |
| Magnesium Oxide (magnesium oxygen-containing compound 135) | 26% |
| Magnesium sulfate heptahydrate (magnesium salt 125) | 20% |
| Tap water at 100° C. (heated water 115) | 19.5% |
| Citric Acid (retarder 145A/225A) | 0.3% |
| Sodium gluconate and sucrose (stabilizer 145B/225B) | 0.2% |
| Magnesium carbonate (carbonate aggregate 215A) | 10% |
| Calcium carbonate (carbonate aggregate 215A) | 10% |
| Expanded glass (light aggregate 215B) | 10% |
| Zeolite (water absorbing aggregate 215C) | 2% |
| Chopped glass fibre (reinforcing aggregate 215D) | 2% |

In the first experiment, the cement was formed with tap water at 100° C. and the concrete was cured at approximately 25° C. and 10% relative humidity for 4 hours during a first stage 320A and at approximately 18° C. with a relative humidity of approximately 80% for the next 16 hours during a second stage 320B. The humidity was allowed to gradually decay until testing on day 1 and 7.

In the first experiment, it was found that the working time of the concrete was between approximately 30 and 60 minutes and the setting time of the concrete was between approximately 3 and 5 hours. It was also found that the day 1 strength of the concrete was between approximately 20 MPa and 37.6 MPa and the day 7 strength was between approximately 20 MPa and 41.6 MPa. It was also found that the two day water absorption was between 0.5 and 4 wt. %. The compressive strength after 48 hours with pat drying changed between +40% and −25% versus the dry sample baseline.

In a second experiment, concrete was formed according to method 200 described herein by employing cement formed according to method 100 described herein wherein the composition of the concrete comprised:

TABLE 2

| Concrete Composition for Second Experiment | |
| --- | --- |
| Constituent | Weight % |
| Magnesium Oxide (magnesium oxygen-containing compound 135) | 40.6% |
| Magnesium sulfate heptahydrate (magnesium salt 125) | 12.5% |
| Tap water at 70° C. (heated water 115) | 25.0% |
| Citric Acid (retarder 145A/225A) | 0.5% |
| Sodium gluconate and sucrose (stabilizer 145B/225B) | 0.3% |
| Magnesium carbonate (carbonate aggregate 215A) | 6.2% |
| Calcium carbonate (carbonate aggregate 215A) | 6.2% |
| Expanded glass (light aggregate 215B) | 5.0% |
| Zeolite (water absorbing aggregate 215C) | 2.5% |
| Chopped glass fibre (reinforcing aggregate 215D) | 1.2% |

In the second experiment, cement was formed with tap water at 70° C. and the concrete was cured at approximately 22° C. and approximately 10% relative humidity for 4 hours during a first stage 320A and at approximately 18° C. with a relative humidity of approximately 15% until testing during a second stage 320B.

In the second experiment, it was found that the working time of the concrete was between approximately 15 and 30 minutes and the setting time of the concrete was between approximately 3 and 5 hours. It was also found that the day 1 strength of the concrete was between approximately 11 MPa and 16 MPa and the day 7 strength was between approximately 21 MPa and 30 MPa.

In a third experiment, concrete was formed according to method 200 described herein by employing cement formed according to method 100 described herein wherein the composition of the concrete comprised:

TABLE 3

Concrete Composition for Third Experiment

| Constituent | Weight % |
| --- | --- |
| Magnesium Oxide (magnesium oxygen-containing compound 135) | 24% |
| Magnesium chloride hexahydrate (magnesium salt 125) | 25% |
| Tap water at 95° C. (heated water 115) | 15% |
| Potassium phosphate (accelerator 145D/225D) | 1.1% |
| Calcium stearate (moisture controller 145C/225C) | 0.6% |
| Rosin (air entrainer 145F/225F) | 0.2% |
| Magnesium carbonate (carbonate aggregate 215A) | 10.3% |
| Calcium carbonate (carbonate aggregate 215A) | 10.3% |
| Expanded glass (light aggregate 215B) | 7.6% |
| Zeolite (water absorbing aggregate 215C) | 4% |
| Chopped glass fibre (reinforcing aggregate 215D) | 1.9% |

In the third experiment, cement was formed with tap water at 95° C. It was found that the working time of the concrete was between approximately 30 and 75 minutes and the setting time of the concrete was between approximately 5 and 8 hours. The slump test following ASTM C143 was between 6 and 24 inches through the duration of the working time. It was also found that the day 1 strength of the concrete was between approximately 14 MPa and 25 MPa and the day 7 strength was between approximately 23 MPa and 33 MPa. The 2-day water absorption after pat drying is between 1 and 3.5 wt. % of the dry mass. The change in compressive strength was between +21% and −12% versus dry sample baseline.

In a fourth experiment, a first concrete (referred to in FIG. 5A, FIG. 5B and herein as "Concrete 1") and a second concrete (referred to in FIG. 5A, FIG. 5B and herein as "Concrete 2") were compared against a ready mix ordinary Portland cement based concrete (referred to in FIG. 5A, FIG. 5B and herein as "Conventional Portland") for compressive strength and density at day 1, day 7, day 14 and day 28.

Concrete 1 was formed according to method 200 described herein by employing a cement formed according to method 100 described herein wherein the composition of the concrete comprised:

TABLE 4

Concrete Composition for Concrete 1

| Constituent | Weight % |
| --- | --- |
| Magnesium Oxide (magnesium oxygen-containing compound 135) | 25.2% |
| Magnesium chloride hexahydrate (magnesium salt 125) | 25.7% |
| Tap water at 60° C. (heated water 115) | 15.9% |
| Polyvinyl alcohol (air entrainer 145F/25F) | 0.2% |
| Cocamidopropyl betaine (Foaming agent 145E/225E) | 0.8% |
| Magnesium carbonate (carbonate aggregate 215A) | 10.0% |
| Calcium carbonate (carbonate aggregate 215A) | 12.0% |
| Expanded glass (light aggregate 215B) | 8.1% |
| Chopped glass fibre (reinforcing aggregate 215D) | 2.1% |

Concrete 1 was demolded at approximately 24 hours and cured at ambient conditions until testing date.

Concrete 2 was also formed according to method 200 described herein by employing a cement formed according to method 100 described herein wherein the composition of the concrete comprised:

TABLE 5

Concrete Composition for Concrete 2

| Constituent | Weight % |
|---|---|
| Magnesium Oxide (magnesium oxygen-containing compound 135) | 25% |
| Magnesium chloride hexahydrate (magnesium salt 125) | 26% |
| Tap water at 60° C. (heated water 115) | 16% |
| Magnesium carbonate (carbonate aggregate 215A) | 11% |
| Calcium carbonate (carbonate aggregate 215A) | 12% |
| Expanded glass (light aggregate 215B) | 8% |
| Chopped glass fibre (reinforcing aggregate 215D) | 2% |

Concrete 1 was demolded at approximately 24 hours and cured at ambient conditions until testing date.

Figure 5A:
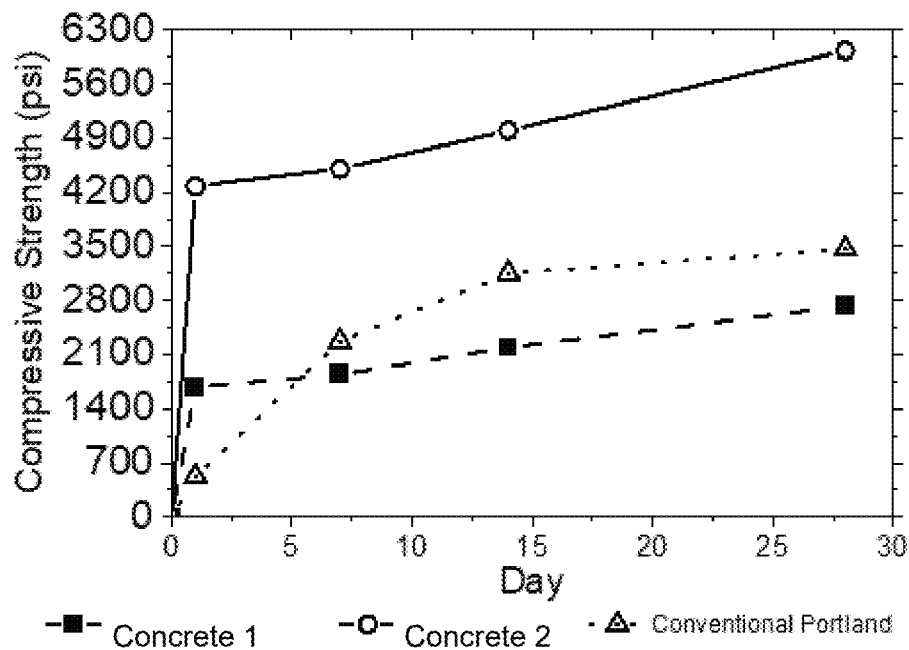
FIG. 5A is a chart representative of the compressive strength of a variety of concretes as a function of time.

As can be seen from FIG. 5A, Concrete 1 exhibits significantly higher compressive strength at day 1, day 7, day 14 and day 28 as compared to Concrete 2 and the Conventional Portland while Concrete 2 exhibits higher compressive strength at day 1 than Conventional Portland and similar compressive strength at days 7, 14 and 28 as compared to Conventional Portland.

Figure 5B:
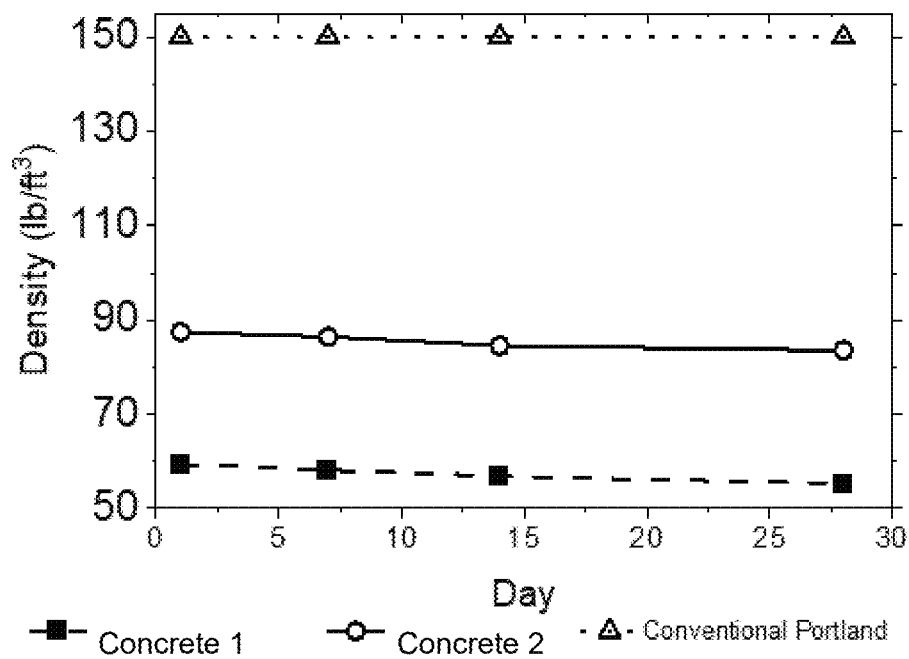
FIG. 5B is a chart representative of the density of a variety of concretes as a function of time.

As can be seen from FIG. 5B, Concrete 1 and Concrete 2 each exhibit significantly lower density at days 1, 7, 14 and 28 as compared to the Conventional Portland. The reduced density of Concrete 1 is due at least in part to foaming agent 145E and air entrainer 145F.

In view of FIG. 5A and FIG. 5B, the strength to weight ratio of the concretes made according to methods 100 and 200 appears to be significantly higher than that of the conventional Portland cement based concrete.

Interpretation of Terms

Unless the context clearly requires otherwise, throughout the description and the "comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms. These terms ("a", "an", and "the") mean one or more unless stated otherwise;

"and/or" is used to indicate one or both stated cases may occur, for example A and/or B includes both (A and B) and (A or B);

where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and "first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", "upwind", "downwind" and the like, used in this description and any accompanying claims (where present), depend at least in part on the specific orientation of the apparatus described and illustrated. The subject matter described herein may assume various alternative orientations or configurations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about" or "approximately". In this context, "about" or "approximately" provides literal support for the exact numerical value that it precedes, the exact numerical value±10%, as well as all other numerical values that are near to or approximately equal to that numerical value. Unless otherwise indicated a particular numerical value is included in "about" or "approximately" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:

in some embodiments the numerical value is 10;

in some embodiments the numerical value is in the range of 9.0 to 11.0;

and if from the context the person of ordinary skill in the art would understand that values within a certain range are substantially equivalent to 10 because the values with the range would be understood to provide substantially the same result as the value 10 then "about 10" also includes:

in some embodiments the numerical value is in the range of C to D where C and D are respectively lower and upper endpoints of the range that encompasses all of those values that provide a substantial equivalent to the value 10.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

In some embodiments, a non-transitory, computer readable medium is provided having one or more of an application program including computer instructions configured to cause at least one server and/or at least one processor to perform the methods (or one or more steps/blocks thereof) according to any of the disclosed methods.

Method embodiments (as well as one or more steps thereof) can be configured as computer readable program instructions (corresponding to the blocks/steps/methods) and can be downloaded to respective computing/processing devices from a computer readable storage medium or to an external computer or external storage device via a network, for example, the Internet, a local area network, a wide area network and/or a wireless network.

Aspects of the present disclosure are described sometimes with reference to a flow, a flow diagram, and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions, operable, for example, on one or more components (e.g., server(s), processor(s)). These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks, in accordance with embodiments of the present disclosure.

Any flowchart and block diagrams of the present disclosure are examples of architecture, functionality, and operations, of at least some of the embodiments of systems, methods, and computer readable media supported herein. In this regard, each block in the flowchart or block diagrams may represent a module, segment, or portion of instructions, which includes one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be understood that at least some embodiments of the present disclosure can correspond to a cloud computing environment, but are not so limited, as embodiments of the present disclosure are capable of being implemented in conjunction with any other type of computing environment now known or later developed. With respect to a cloud computing environment, such is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. A method of producing magnesium cement, the method comprising:
    mixing:
        water at a temperature of between approximately 50° C. and 100° C., wherein the water comprises total dissolved solids of greater than 0 g/L and less than approximately 350 g/L;
        a magnesium oxygen-containing compound; and
        a magnesium salt; and
    increasing the amount of the total dissolved solids in the water before the mixing step.

2. The method according to claim 1 wherein the water is at a temperature of between approximately 70° C. and 90° C.

3. The method according to claim 1 wherein the dissolved solids comprise one or more of sodium chloride, calcium chloride, a magnesium salt, magnesium chloride, magnesium sulfate and magnesium phosphate.

4. The method according to claim 1 wherein the water comprises one or more of tap water, salt water, ocean water, seawater and industrial waste water.

5. The method according to claim 1 wherein the magnesium oxygen-containing compound comprises one or more of magnesium oxide and magnesium hydroxide.

6. The method according to claim 1 wherein the magnesium salt comprises one or more of magnesium acetate, magnesium bromide, magnesium oxalate, magnesium thiosulfate, magnesium phosphate, magnesium nitrate, magnesium silicate, a magnesium chloride in any hydration state, anhydrous magnesium chloride, hexahydrate magnesium chloride, a magnesium sulfate in any hydration state, anhydrous magnesium sulfate, heptahydrate magnesium sulfate and magnesium carbonate.

7. The method according to claim 1 wherein the magnesium oxygen-containing compound comprises magnesium oxide and a molar ratio of magnesium oxygen-containing compound to water at the mixing step is between approximately 1:6 and 40:41.

8. The method according to claim 1 wherein a molar ratio of the magnesium oxygen-containing compound to the magnesium salt at the mixing step is between approximately 1:1 and 40:1.

9. The method according to claim 1 comprising mixing:
    the water;
    the magnesium oxygen-containing compound;
    the magnesium salt; and
    one or more additives.

10. The method according to claim 9 wherein the one or more additives comprise a retarder wherein the retarder comprises one or more compounds containing carboxylic acid, malic acid, glutamic acid, gluconic acid, malonic acids, fumaric acid, oleic acid, palmitic acid, stearic acid, citric acid and salicylic acid.

11. The method according to claim 9 wherein the one or more additives comprise a stabilizer wherein the stabilizer comprises one or more of potassium acetate, tartaric acid, an alkali metal salt, triethanolamine, lignosulfonate, hexametaphosphate, sodium gluconate, sucrose, polycarboxylate, borax and boric acid.

12. The method according to claim 9 wherein the one or more additives comprise a moisture controller wherein the moisture controller comprises one or more compounds containing silane, stearate or diol groups.

13. The method according to claim 9 wherein the one or more additives comprise an accelerator wherein the accelerator comprises one or more compounds containing nitrate, phosphate, chloride or nitrite groups.

14. The method according to claim 9 wherein the one or more additives comprise a foaming agent wherein the foaming agent comprises one or more compounds containing reactive oxygen, hydrogen peroxide reacted with a catalyst, hydrogen peroxide reacted with potassium iodide, fatty alcohol sulfates, cocamidopropyl betaine, alkyl sulfates, sodium dodecyl sulfate, sodium lauryl sulfate, air and carbon dioxide.

15. The method according to claim 9 wherein the one or more additives comprise an air entrainer wherein the air entrainer comprises one or more compounds containing polymers, polyvinyl alcohol, polyether, bio-based materials, rosin and sodium lignosulfonate.

16. The method according to claim 1 comprising mixing the water with the magnesium salt to form an intermediate mixture and then mixing the intermediate mixture with the magnesium oxygen-containing compound.

17. A method of producing magnesium cement, the method comprising:
    mixing:
        water at a temperature of between approximately 50° C. and 100° C.;
        a magnesium oxygen-containing compound; and
        a magnesium salt;
    wherein the magnesium oxygen-containing compound comprises magnesium hydroxide and a molar ratio of magnesium oxygen-containing compound to water at the mixing step is between approximately 1:5 and 40:1.

* * * * *